United States Patent [19]

Allen

[11] 4,359,341
[45] Nov. 16, 1982

[54] STARCH BASED ADHESIVES AND METHOD THEREFOR

[75] Inventor: Leon A. Allen, East Ivanhoe, Australia

[73] Assignee: Harper-Love Adhesives Corporation, Charlotte, N.C.

[21] Appl. No.: 325,116

[22] Filed: Nov. 27, 1981

Related U.S. Application Data

[63] Continuation-in-part of Ser. No. 176,529, Aug. 8, 1980, abandoned, which is a continuation-in-part of Ser. No. 169,292, Jul. 15, 1980, abandoned.

[30] Foreign Application Priority Data

Jul. 27, 1979 [AU] Australia ............................. PD9758

[51] Int. Cl.$^3$ ............................................. C08L 3/00
[52] U.S. Cl. ..................................... 106/213; 156/336
[58] Field of Search ......................................... 106/213

[56] References Cited

U.S. PATENT DOCUMENTS

| | | | |
|---|---|---|---|
| 2,105,052 | 1/1933 | Oltmans ................................. | 127/32 |
| 3,015,572 | 1/1962 | Casey et al. ...................... | 106/192 C |
| 3,355,307 | 11/1967 | Schoenberger et al. ............ | 106/213 |
| 4,014,727 | 3/1977 | Musselman et al. ................ | 106/213 |
| 4,157,318 | 6/1978 | Sadle et al. .......................... | 106/213 |
| 4,272,295 | 6/1981 | Linke .................................... | 106/213 |

FOREIGN PATENT DOCUMENTS

| | | | |
|---|---|---|---|
| 14147/70 | 11/1971 | Australia . | |
| 14149/70 | 11/1971 | Australia . | |
| 80695/75 | 11/1976 | Australia ............................ | 106/213 |
| 645979 | 7/1962 | Canada ................................ | 106/213 |
| 1340199 | 12/1973 | United Kingdom ................ | 106/213 |

*Primary Examiner*—Allan Lieberman
*Attorney, Agent, or Firm*—Woodard, Weikart, Emhardt & Naughton

[57] ABSTRACT

A process for preparing a carrier type starch which is characterized by the steps of mixing two starch portions having different gelatinization temperatures with water to form a slurry and causing gelatinization of the starch portion having the lower gelatinization temperature to thereby form a stable gelatinized carrier for the raw starch portion having the higher gelatinization temperature. The ratio of the starch portion having the lower gelatinization temperature to the starch portion having the higher gelatinization temperature is preferably of the order of from 1:10 to 1:4 and the ratio by weight of the starch portions to water is of the order of from 1:2 to 1:4, preferably about 1:3. A carrier type starch based adhesive comprising a mixture of a gelatinized carrier starch portion and a raw starch portion having a higher gelatinization temperature dispersed in the carrier portion is also disclosed.

20 Claims, No Drawings

STARCH BASED ADHESIVES AND METHOD THEREFOR

REFERENCE TO RELATED APPLICATION

This application is a continuation-in-part of my copending application Ser. No. 176,529, filed Aug. 8, 1980, which was a continuation-in-part of my copending application Ser. No. 169,292, filed on July 15, 1980; both now abandoned.

BACKGROUND OF THE INVENTION

1. Field of the Invention

This invention relates to the preparation of starch based adhesives suitable for use in the manufacture of corrugate board or other paper products in which the adhesive is heated to cause bonding.

2. Description of the Prior Art

The Stein-Hall process for preparing starch adhesives for the manufacture of corrugated board was introduced in the United States in the 1930's, and is still used in most countries of the world. Such adhesive consists of raw starch granules suspended in water, to which gelatinised starch is added to increase the viscosity of the mix and thus keep the starch granules from settling. Caustic soda and borax are typically used in the mix to control the gelatinisation or "gel" temperature of the raw starch granules and to improve the tack and "body" of the adhesive.

In the Stein-Hall process, the gelatinised or "cooked" starch portion, normally referred to by the trade as the "carrier" portion, has to be prepared separately from the raw starch portion. The carrier portion gives the starch adhesive the required viscosity, not only to suspend the raw starch particles in the raw starch portion, but also to enable the adhesive to be picked up by the adhesive applicator rolls of the corrugated board producing apparatus. In most corrugated box board plants, the carrier portion is prepared in a separate tank, called the primary mixer or the carrier mixer. The carrier portion is then mixed with a raw starch slurry in a secondary mixer or in the main mixing tank.

Modifications of the classical Stein-Hall (two component system) have been introduced over the years. Such modifications include the following:

(a) The carrier portion has been separately prepared by gelatinising the starch and drying it. This material has then been blended with the raw starch portion before the addition of the dry material to alkaline water. This enables a one tank preparation to be made of the starch adhesive. However, these systems are not economical, as the manufacture of pre-gelatinised starch and the subsequent blending process is costly. In some instances the use of alternative carriers, such as carboxy methyl cellulose, have been advocated. (U.S. Pat. No. 3,015,572, Casey et al.), although similar economic limitations apply.

(b) The carrier portion of the starch is prepared in the main mixing tank. Cold water is then added to the carrier portion to cool it and to dilute it sufficiently to allow the raw starch portion to be dispersed in the carrier solution. Such a process requires a high performance mixer as the raw starch is difficult to disperse in the viscous carrier solution.

(c) The carrier portion is prepared by recirculating a starch suspension through an in-line cooker until sufficient starch has been gelatinised to form the carrier. The equipment cost of such a system is high.

As an alternative concept the "no carrier" or "carrier free" system was introduced. The adhesive is prepared in one tank but the conditions are controlled such that no separate gelatinised carrier is formed. The viscosity is achieved by uniformly partially swelling all of the raw starch granules within the system. The principle here decrees that only a very small quantity of starch is solubilised into the liquid phase. This system requires sophisticated processing equipment to control the operation and is costly to operate (U.S. Pat. No. 3,355,307 Schoenerger).

In Australian Pat. No. 14,147/70 there is disclosed a starch adhesive of this type comprising "a single homogeneous composition composed of partially swollen starch granules." This patent also notes the production of starch adhesives due to localized gelatinisation at the point of addition of the caustic soda in certain methods. However, there is no suggestion of a starch adhesive which includes starch components of different gelatinisation or gel temperatures and in which one component is gelled in the presence of the other. The latter process of this Australian patent relates to localized concentration effects of the caustic soda in one starch mix, which necessarily produces an uneven mix, whereas the present invention utilizes temperature control with different starch portions to yield an even mix. Other examples of the prior art starch adhesives as above described are the following: U.S. Pat. No. 2,105,052, issued to Oltmans on Jan. 11, 1938; U.S. Pat. No. 3,355,307, issued to Schoenberger et al. on Nov. 28, 1967; U.S. Pat. No. 4,014,727, issued to Musselman on Mar. 29, 1977; U.S. Pat. No. 4,157,318, issued to Sadle on June 5, 1979; Canadian Pat. No. 645,979, issued to Lehman in July, 1962; Australian Pat. No. 14,149/70, issued to Billy in Nov., 1971; Great Britain Pat. No. 1,340,199, issued to Hampton in Dec., 1973; and Australian Pat. No. 80,695/75, issued to Linke in Nov., 1976.

SUMMARY OF THE INVENTION

It is the object of the present invention to significantly simplify the process for preparing carrier-type starch adhesives by employing an in-situ carrier producing system. The invention provides a process for preparing a carrier-type starch based adhesive, characterized by the steps of mixing at least two starch portions having different gelatinisation or gel temperatures with water under alkaline conditions to form a slurry, and causing gelatinisation of the starch portion having the lower gelatinisation temperature under such conditions to thereby form a stable gelatinised carrier for the raw starch portion having the higher gelatinisation temperature.

DESCRIPTION OF THE PREFERRED EMBODIMENTS

For the purposes of promoting an understanding of the principles of the invention, reference will now be made to the embodiments. It will nevertheless be understood that no limitation of the scope of the invention is thereby intended, such alterations and further modifications in the process, and such further applications of the principles of the invention therein being contemplated as would normally occur to one skilled in the art to which the invention relates.

Gelatinisation of the starch portion having the lower gel temperature may be achieved by heating such slurry until the gel temperature is reached, by mixing the starch portions in alkaline water which has been heated to a temperature sufficient to cause gelatinisation as the slurry is mixed or by adding an alklai to the combined starch slurry after the slurry has been heated to a suitable temperature. It will be appreciated by those in the art that the gel temperature of a starch will depend on various factors such as concentration of the starch or alkali. The term gel temperature therefore relates to the temperature at which substantial gelling of the particular starch portion will occur in view of the values of these various parameters.

The process is most conveniently performed with two or more starch portions having relatively widely different gelatinisation temperatures, for example, not less than about 5° C. However, the process may be performed at gel temperature differences of the order of at least about 2° C.–3° C. provided the temperature of the slurry is raised very slowly during the period of gelatinisation of the carrier portion. The different starch portions should of course be present in the appropriate concentrations in the water to produce adhesive having the desired viscosity to support the raw starch granules and to enable the adhesive to be picked up by the adhesive applicator rolls and to provide a final adhesive which, upon activation of the raw starch portions provides the necessary adhesive strength.

It is preferred that the two starch portions comprise two different starches having different gelatinisation temperatures. However, each starch portion may comprise the same type of starch with one portion being modified in a known manner to raise or lower its gelatinisation temperature by the desired amount. The starch portion having the lower gelatinisation temperature may be selected from various ones, such as the group comprising wheat starch, tapioca starch, and potato starch. The starch portion having the higher gelatinisation temperature also may be selected from various ones such as the group comprising corn starch, tapioca starch or wheat starch. Where corn starch is used as the principal or raw starch portion, any one of the lower gelatinisation temperature starches may be used. However, where tapioca starch is used as the raw starch portion, either wheat starch or potato starch may be used as the carrier, and if wheat starch is used as the raw starch portion, only potato starch may be used as the carrier.

It is well known that caustic soda, or any other suitable alkali, is used to control the gelatinisation of starches. Because of low cost and easy availability it is preferred that caustic soda be used as the alkali to control the temperature at which gelatinisation temperature occurs. The caustic soda may be added to the mixture either before, during or after the formation of the initial starch slurry, or after heating the slurry to a suitable temperature. Borax or boric acid is added after the starch portion having the lower gel temperature (carrier) has gelatinised, as indicated by a suitable rise in the viscosity of the mix.

As is usual with known starch preparation processes, other additives, such as defoamers, fillers and wetting agents may be added to the mixture to give the final starch the desired properties.

The above process has the following advantages over the known processes outlined above:
1. No separate preparation of the carrier portion to achieve the desired viscosity is necessary, as the carrier is formed in-situ.
2. The entire mixing process can be performed in one mixing tank; high performance mixers and in-line cookers are not necessary.
3. Pre-blending of the different starches is not necessary.
4. The mixing process can be automated at a relatively low cost.

The invention thus provides a starch based adhesive comprising a mixture of gelatinised carrier starch portion formed in situ and a raw starch portion having a higher gelatinisation temperature dispersed therein.

According to one preferred process of preparing an adhesive embodying the invention the starches having different gelatinisation temperatures are dispersed in water in a mixing tank. Caustic soda solution is added to the dispersion and the mixture is then slowly warmed until the starch with the lower gel temperature gelatinises, giving the mix the desired viscosity. Borax, and, if necessary, other chemicals are then added to finish the adhesive.

If desired a proportion of water may be left out of the initial mix, which enables the in-situ gelatinisation of the carrier proportion to be achieved at a lower temperature. The proportion of water is then added after the gelatinisation followed by borax and other chemicals.

The caustic soda may be dissolved in the water before the starches are dispersed. After dispersion of starches the process is otherwise similar to that described above. Similarly the water and starch mixture may be heated first and the alkali added after a suitable temperature has been reached.

The ratio by weight of the starch having the lower gelatinisation temperature to water depends on the desired gelatinised viscosity of the final adhesive. This ratio can vary from about 1:10 to about 1:50, preferably 1:25 to 1:35. The ratio by weight of the starch of the higher gelatinisation temperature, and remaining in the finished adhesive as the raw starch proportion, to water depends on the desired total solids concentration in the final adhesive. This ratio can vary from about 1:2 to about 1:8 preferably 1:3 to 1:5. As indicated by the following preferred embodiment and examples, the weight ratio of the two starch portions to water may fall in the range 1:2 to 1:4 and most preferably is about 1:3.

Using the above ratios would yield corrugating adhesives with approximate combined starch solids ranging from 17% to 34%, the preferred range being 20% to 32.5%. The portion of the first starch portion to form the "carrier" would range from 6% to 33%, calculated on total starch, the preferred ratio being from about 1 to 10 to about 1 to 4 corresponding to a weight percent range of 10% to 25% of the first starch portion to the total starch.

The quantities of caustic soda and borax used depend on the starch used as the final raw starch proportion and on the gel-point desired for this starch in the final adhesive. Normal formulating techniques are used to establish the optimum levels for these chemicals for different starches and conditions. Since these aspects do not form part of the invention and are well understood by persons skilled in the art, further description will not be provided.

EXAMPLE 1

In this experimental laboratory embodiment 350 g of tapioca starch and 3000 g of corn starch were dispersed in 9 liters of water. 500 mols of 20% w/v caustic soda solution was added gradually to the starch dispersion, while this was agitated. The mixture was then slowly warmed until the tapioca starch gelatinised, as measured by a change in the refractive index of the mixture. The temperature of the mixture at this stage was 38° C. 55 g of borax (10 moles $H_2O$) was added to the mixture and the adhesive was agitated for further 10 minutes to ensure that the borax was dissolved.

The viscosity of the finished adhesive was found to be 52 seconds (Stein-Hall cup) and its gel point 63° C.

EXAMPLE 2

The adhesive was prepared as in Example 1 except that 100 g of caustic soda were dissolved in 9½ liters of water and the corn starch and tapioca starch were dispersed in the weak caustic soda solution. The order of addition did not significantly change the temperature of gelatinisation of the tapioca starch nor the measured properties of the finished adhesive referred to above.

EXAMPLE 3

In this small commercial trial embodiment 10 kg of caustic soda were added to 925 liters of water in a mixer and the mixture heated to between 20° C. and 25° C. to produce an approximate 1.1% caustic soda solution. 300 kg of commercial grade corn starch followed by 45 kg of wheat starch were added to the caustic soda dispersion and the resultant mixture vigorously mixed. The mixture was warmed to approximately 32° C. and held at this temperature for about 10 minutes. An aqueous solution containing approximately 6 kg of borax decahydrate was added and the mixture agitated for a further 10 minutes. The adhesive manufactured in accordance with the above directions was found to have the necessary viscosity and gel point properties to enable commercial production of double-wall board under normal plant conditions.

EXAMPLE 4

In this commercial scale embodiment 725 kg of commercial grade corn starch were added to approximately 1910 liters of water in a mixing tank and the mixture was heated to approximately 28° C. while being mixed. 14 kg of caustic soda were dissolved in water and the caustic soda solution was added to the mixture while mixing was continued. The mixture was then gently heated until the viscosity of the mixture reached approximately 28 seconds (Stein-Hall cup). 3 kg boric acid and 2 liters of silicate of soda solution were then added to the mixture. The resultant adhesive was then successfully tested on a commercial double-wall board manufacturing plant.

As those conversant with the manufacture of corrugating and other adhesives will appreciate, the properties of the adhesives described above may need to be modified to suit the requirements of a particular plant or a particular type of paper. Accordingly, the quantities of the starch portions described above may be varied to alter the viscosity of the starch adhesive or to alter the amount of raw starch present therein. Similarly, any one or more additives may be introduced into the starch to provide different performance characteristics as required by the user. Thus, while a simple starch adhesive may comprise only the raw starch portion, the in-situ gelatinised carrier starch portion, together with caustic soda and borax, a commercial starch adhesive may include other additives such as fillers, defoamers and wetting agents. Whether such additives are present in the starch or not, the starch produced by the method according to the present invention will have all of the advantages of the carrier-type starch adhesive without the manufacturing difficulties and attendant increased costs applicable to such known starch adhesive preparation processes.

Although any two or more commercially produced starches may be used in carrying out the invented process as above described, it is essential that the lesser portion of starch forming the "in-situ" carrier has a lower gelatinisation temperature in the stated conditions than the main starch portion. It will be evident to those skilled in the art that the combinations of starches employed will vary according to the machinery and paper employed within the process. Thus the user can modify the system to suit his own particular requirements. The variety of starches, alkali and buffers suitable for use in adhesives of the described type are well known in the art, and any of these suitable materials may be used within the parameters defined herein.

What is claimed is:

1. A process for preparing a carrier-type starch adhesive comprising the steps of:
   (a) preparing a mixture of first and second starch portions, a suitable alkali, and water to form a slurry, the first starch portion having a gelatinisation temperature at least about 2° C. lower than the second starch portion, said mixing comprising mixing the first starch portion in a weight ratio of from about 1 to 10 to about 1 to 50 relative the water, and the second starch portion in a weight ratio of from about 1 to 2 to about 1 to 8 relative the water, and the total starch portion in a weight ratio of from about 1 to 2 to about 1 to 4 relative the water; and
   (c) causing gelatinisation of the starch portion having the lower gelatinisation temperature to thereby form a stable gelatinised carrier for the raw starch portion having the higher gelatinisation temperature, said causing of gelatinisation including maintaining the slurry at a temperature below the gelatinisation temperature of the second starch portion but at least as high as the gelatinisation temperature of the first starch portion.

2. The process of claim 1 and further comprising the step of adding a suitable buffering material to the slurry following gelatinisation of the first starch portion.

3. The process of claim 1, wherein gelatinisation of said first starch portion having the lower gelatinisation temperature is achieved by heating said slurry of step a. at least until the lower gelatinisation temperature is reached but below the higher gelatinisation temperature.

4. The process of claim 3 and further comprising the step of adding a suitable buffering material to the slurry following gelatinisation of the first starch portion.

5. The process of claim 4 wherein said alkali is caustic soda and said buffering material is borax or boric acid.

6. The process of claim 3 in which the first starch portion has a gelatinisation temperature at least about 5° C. lower than the gel temperature of the second starch portion.

7. The process of claim 6 in which the weight ratio of the first starch portion to the water is from about 1 to 25 to about 1 to 35, the weight ratio of the second starch portion to the water is from about 1 to 3 to about 1 to 5, and the weight ratio of the two starch portions to the water is about 1 to 3.

8. The process of claim 7 wherein the ratio of the first starch portion having the lower gelatinisation temperature to the second starch portion having the higher gelatinisation temperature is from about 1:10 to about 1:4.

9. The process of claim 8 wherein the starch portion having the lower gelatinisation temperature is selected from the group consisting of wheat, tapicoa and potato, and the starch having the higher gelatinisation temperature is selected from the group consisting of corn, tapioca and wheat.

10. The process of claim 1, wherein step a. comprises mixing the alkali with water prior to addition of the first starch portion, and in which said causing of gelatinisation of said first starch portion having the lower gelatinisation temperature comprises mixing said first starch portion with the alkaline water maintained at a temperature high enough to cause the starch portion for the lower gelatinisation temperature to gelatinise as said slurry is mixed but low enough to prevent significant gelatinisation of the second starch portion.

11. The process of claim 10 and further comprising the step of adding a suitable buffering material to the slurry following gelatinisation of the first starch portion.

12. The process of claim 11 wherein said alkali is caustic soda and said buffering material is borax or boric acid.

13. A process for preparing a carrier-type starch adhesive comprising the steps of:
(a) preparing a mixture of first and second starch portions and water to form a slurry, the first starch portion having a gelatinisation temperature at least about 2° C. lower than the second starch portion, said mixing comprising mixing the first starch portion in a weight ratio of from about 1 to 10 to about 1 to 50 relative the water, and the second starch portion in a weight ratio of from about 1 to 2 to about 1 to 8 relative the water, and the total starch portion in a weight ratio of from about 1 to 2 to about 1 to 4 relative to the water, and
(b) heating said slurry to a temperature below the gel temperature of the second starch portion at the specific alkaline conditions depending on the quantity of alkaly to be added under (c) but at least as high as the gel temperature of the first starch portion; and
(c) adding to the heated slurry a suitable alkaline to cause gelatinisation of the first starch portion.

14. A carrier type starch based adhesive prepared by the process comprising the steps of:
(a) preparing a mixture of first and second starch portions, a suitable alkali, and water to form a slurry, the first starch portion having a gelatinisation temperature at least about 2° C. lower than the second starch portion, said mixing comprising mixing the first starch portion in a weight ratio of from about 1 to 10 to about 1 to 50 relative the water, and the second starch portion in a weight ratio of from about 1 to 2 to about 1 to 8 relative the water, and the total starch portion in a weight ratio of from about 1 to 2 to about 1 to 4 relative the water; and
(b) causing gelatinisation of the starch portion having the lower gelatinisation temperature to thereby form a stable gelatinised carrier for the raw starch portion having the higher gelatinisation temperature, said causing of gelatinisation including maintaining the slurry at a temperature below the gelatinisation temperature of the second starch portion but at least as high as the gelatinisation temperature of the first starch portion.

15. The adhesive of claim 14 wherein the ratio of the first starch portion having the lower gelatinisation temperature to the second starch portion having the higher gelatinisation temperature is from about 1:10 to about 1:4.

16. The adhesive of claim 14 wherein the first starch portion having the lower gelatinisation temperature is selected from the group consisting of wheat, tapioca and potato, and the second starch portion having the higher gelatinisation temperature is selected from the group consisting of corn, tapioca and wheat.

17. The adhesive of claim 16 wherein the ratio by weight of total starch portions to water is from about 1:2 to about 1:4.

18. The adhesive of claim 17 wherein said ratio of total starch portions to water is about 1:3.

19. The adhesive of claim 17 in which the weight ratio of the first starch portion to the water is from about 1 to 25 to about 1 to 35, the weight ratio of the second starch portion to the water is from about 1 to 3 to about 1 to 5, and the weight ratio of the two starch portions of the water is about 1 to 3.

20. The adhesive of claim 16 wherein the ratio of the first starch portion having the lower gelatinisation temperature to the second starch portion having the higher gelatinisation temperature is from about 1:10 to about 1:4.

* * * * *